(12) United States Patent
Armbruster et al.

(10) Patent No.: US 9,680,735 B2
(45) Date of Patent: Jun. 13, 2017

(54) METHOD FOR OPERATING A COMMUNICATION NETWORK, AND NETWORK ARRANGEMENT USING PRIORITIZED DATA INTERCHANGE

(71) Applicant: SIEMENS AKTIENGESELLSCHAFT, München (DE)

(72) Inventors: Michael Armbruster, München (DE); Ludger Fiege, Grafing (DE); Johannes Riedl, Ergolding (DE); Thomas Schmid, Leinfelden-Echterdingen (DE); Andreas Zirkler, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 167 days.

(21) Appl. No.: 14/370,791

(22) PCT Filed: Dec. 10, 2012

(86) PCT No.: PCT/EP2012/074897
§ 371 (c)(1),
(2) Date: Jul. 7, 2014

(87) PCT Pub. No.: WO2013/104474
PCT Pub. Date: Jul. 18, 2013

(65) Prior Publication Data
US 2015/0006701 A1   Jan. 1, 2015

(30) Foreign Application Priority Data
Jan. 9, 2012   (DE) ........................ 10 2012 000 188

(51) Int. Cl.
G06F 15/16   (2006.01)
H04L 12/725   (2013.01)
(Continued)

(52) U.S. Cl.
CPC ........ *H04L 45/30* (2013.01); *H04L 12/40163* (2013.01); *H04L 12/437* (2013.01); *H04L 41/04* (2013.01)

(58) Field of Classification Search
None
See application file for complete search history.

(56) References Cited

U.S. PATENT DOCUMENTS

| | | | |
|---|---|---|---|
| 6,973,026 B1 * | 12/2005 | Dyrga | H04L 45/00 370/218 |
| 2005/0066106 A1 * | 3/2005 | Lee | G06F 1/22 710/316 |

(Continued)

FOREIGN PATENT DOCUMENTS

| | | |
|---|---|---|
| JP | 2007525107 A | 8/2007 |
| JP | 2009159635 A | 7/2009 |

OTHER PUBLICATIONS

International Search Report; PCT/EP2012/074897; International Filing Date: Dec. 10, 2012; Siemens Aktiengesellschaft; 2 pgs.

*Primary Examiner* — Thomas Dailey
(74) *Attorney, Agent, or Firm* — Schmeiser Olsen & Watts LLP (57) ABSTRACT

A method for operating a communication network, in particular an ethernet network is provided. Each network device coupled to the network has a first control device, a first switch device which is assigned to the first control device, a second control device, and a second switch device which is assigned to the second control device. Each switch device has a transmitting and receiving port for transmitting and receiving data via the communication network, a first internal transmitting and receiving port for transmitting and receiving data between the switch devices, and a second internal transmitting and receiving port for transmitting and receiving data to or from the control device. A respective (Continued)

data exchange at the first and second internal transmitting and receiving port is prioritized over a data exchange at the transmitting and receiving port for transmitting and receiving data via the communication network.

16 Claims, 9 Drawing Sheets

(51) Int. Cl.
*H04L 12/40* (2006.01)
*H04L 12/437* (2006.01)
*H04L 12/24* (2006.01)

(56) References Cited

U.S. PATENT DOCUMENTS

| | | |
|---|---|---|
| 2005/0129037 A1 | 6/2005 | Zumsteg et al. |
| 2008/0107050 A1 | 5/2008 | Paulitsch et al. |
| 2010/0014527 A1* | 1/2010 | Sakauchi ............... H04L 12/42 370/400 |
| 2011/0026411 A1 | 2/2011 | Hao |
| 2011/0116508 A1* | 5/2011 | Kirrmann ............ H04L 12/437 370/392 |
| 2013/0010787 A1* | 1/2013 | Chou .................. H05K 7/1498 370/389 |
| 2013/0138979 A1* | 5/2013 | Wang ................ H04L 12/6418 713/300 |
| 2013/0205129 A1* | 8/2013 | Peng .................. G06F 11/1417 713/2 |

* cited by examiner

METHOD FOR OPERATING A COMMUNICATION NETWORK, AND NETWORK ARRANGEMENT USING PRIORITIZED DATA INTERCHANGE

CROSS-REFERENCE TO RELATED APPLICATIONS

This application claims priority to PCT Application No. PCT/EP2012/074897, having a filing date of Dec. 10, 2012, based off DE Application No. 10 2012 000 188.6 having a filing date of Jan. 9, 2012, the entire contents of which are hereby incorporated by reference.

FIELD OF TECHNOLOGY

The following relates to a method for operating a communication network and to a network arrangement which operates with the proposed method. The operating method can be used, in particular, in an Ethernet environment.

BACKGROUND

Communication networks are being increasingly widely used to measure, control and regulate complex technical systems. For example, networks are being increasingly used in motor vehicles in order to form vehicle control systems. In corresponding complex and safety-relevant technical systems, high demands are imposed on the availability of the control elements provided as network devices. If individual components, for example sensors or control devices, fail, this must not result in failure of the overall system. Drive-by-wire systems, for example steer-by-wire systems, in which the steering wheel position is electromotively converted into wheel positions by means of network coupling of sensor, control and actuator devices are particularly relevant to safety.

In the past, redundant designs of particularly critical components were used, with the result that, in the event of an error, the respective backup or redundant component can undertake the respective task. In the case of a plurality of redundant components, it must be ensured that only one of the two or the plurality of control devices holds the respective control sovereignty. In addition, contradictory control commands must not be produced for the same control functionalities. Therefore, it is necessary for all control components to have the same information or data in the network.

In this respect, it is necessary to detect errors in the form of inconsistent data which may be corrupted, for example, during data transmission via the network used. A standard network environment which is widespread is based on the Ethernet protocol. The use of Ethernet infrastructures has the advantage that standardized network devices and methods can be used. However, in the past, proprietary data buses were also used to link control components with internal redundancy, that is to say duplicate functionality, to one another.

In addition, it is possible for nodes used in the network to be erroneous. Error types in which a network device transmits data containing no data which can be used for the other control devices into the network at high frequency are known, for example. Reference is also made to a "babbling idiot". The network infrastructure can then be loaded by high data rates in such a manner that true control or sensor data can no longer be interchanged between the network devices which are still operating. It is desirable, in particular, to deal with such abnormal behavior in safety-relevant networks and to suitably process the available data in order to ensure reliable operation of the unaffected devices in the network.

In the past, methods were proposed in which the interchange of data between predefined communication partners was bandwidth-limited. However, defective network nodes may also generate data packets with incorrect address data, which cannot be dealt with in a satisfactory manner within the scope of dedicated bandwidth limitation in every network topology, in particular not in a ring-type network topology.

Methods which are based on synchronized communication between the network nodes are also known. In this case, particular time slots for interchanging data between predefined communication partners are defined. Such time slot methods require complicated synchronization and special hardware devices.

Technological backgrounds for the present topic are respectively known from the documents US 2011026411 A1 and US 2008107050 A1.

SUMMARY

An aspect relates to an improved method and/or a network arrangement.

Accordingly, a method for operating a communication network for network devices coupled to the communication network is proposed. The method comprises:

providing network devices each having a first control device and a first switch device associated with the first control device and a second control device and a second switch device associated with the second control device. In this case, the switch devices each have a transmitting and receiving port for transmitting and receiving data via the communication network, a first internal transmitting and receiving port for transmitting and receiving data between the switch devices and a second internal transmitting and receiving port for transmitting and receiving data to/from the control device.

In the method, data interchange at the first and second internal transmitting and receiving ports is prioritized with respect to data interchange at the transmitting and receiving ports for transmitting and receiving data via the communication network, in which case the second is given priority over the first, in particular.

The network which is in the form of an Ethernet communication network, in particular, results in a ring-type formation or coupling of the network devices to one another, for example. The redundant design of the network device with duplicate switch and control devices and enabled internal communication in the respective network device provides secure and reliable data transport in the communication network. The presence of a babbling idiot in the network can also be handled by prioritizing the interchange of data inside the network device with respect to data which arrive from the outside, that is to say via the coupled communication network. Without the proposed prioritization, the meaningless data packets produced at a high data rate would be superimposed on the actual data packets loaded with control data, for example, and would interfere with reliable communication. The prioritization which can be implemented, for example, by means of suitable queues for the data packets, the data packets not transmitted by the babbling idiot nevertheless reliably reach their destination.

The method can also comprise: prioritizing data interchange from the second internal receiving ports to the transmitting ports for transmitting data to the communication network with respect to data interchange at the first internal transmitting and receiving ports. This extended prioritization makes the formed network having the network devices even more robust with respect to errors caused by babbling idiots.

In this case, the prioritization is preferably not effected on the basis of data content of the received data in the switch devices but rather is carried out in a port-based manner. For example, the data transmitted by a babbling idiot might contain incorrect address or priority information, as a result of which prioritization based on information contained in the packet would fail. This is excluded by the port-based prioritization.

The communication network itself may comprise an Ethernet infrastructure. The switch device may also be referred to as a bridge or router device. In the case of network devices, reference is also made to network nodes, network components or network elements.

A CPU, a microprocessor or else other programmable circuits, for example, is/are possible as the control devices provided in the network devices. A control device can also be understood as meaning a sensor or actuator device.

The communication network or network protocol preferably provides point-to-point connections from one subscriber or network device to another. In this case, bidirectional or duplex communication may be possible.

In embodiments, the method also comprises the steps of:
generating first data by the first control device and second data by the second control device, the first data and the second data being linked to one another by means of predefined coding;
transmitting the first data from the first control device to the second control device via the associated switch devices and transmitting the second data from the second control device to the first control device via the associated switch devices, the first and second data passing through the first and second internal transmitting and receiving ports;
transmitting the first data and the second data from the transmitting port of the switch device for the first control device to the receiving port of the switch device for the second control device via a first communication path;
transmitting the first data and the second data from the transmitting port of the switch device for the second control device to the receiving port of the switch device for the first control device via a second communication path. In this case, the data on the first and second communication paths pass through the same network devices in the opposite direction.

The first and second data which are linked to one another by means of predefined coding may be generated by means of a bit inversion, for example. The predefined coding allows a consistency check of both data. If one of the data (packets) is disrupted by the transfer of data via the network, for example, this can be detected by comparison with the respective other data (packet) taking into account the respective coding.

Bidirectional communication (so-called duplex communication) is possible, in particular, in Ethernet-based communication networks. In this respect, the first communication path runs from the transmitting port of the switch device of the first control unit to the receiving port of the switch device of the second control unit, and the second communication path runs from the transmitting port of the switch device of the second control unit to the receiving port of the switch device of the first control unit. The first communication path runs in a ring-type manner via further switch devices or further network devices via the communication network, for example. The second communication path passes through the network devices in the opposite direction. In this respect, redundant transmission and a check of the functionality of all network devices involved become possible. The first and second data are preferably passed from the first control device to the second control device or conversely solely via the switch device inside the network device.

The method for operating a communication network, in particular an Ethernet-based network, results in a ring structure, in which case the resulting communication directions of the Ethernet ring are used. In the event of an error in one of the switch device connected to a control unit in a network device, only one of the directions may be affected in this case, with the result that a consistent data item or data is/are still transmitted. Flexible and reliable error analysis can be carried out by comparing the data which are transmitted on different communication paths and are linked to one another, in particular, by means of coding. It is easily possible to determine the control components or devices which resulted in an error. They are preferably passivated or switched off.

In addition, the error caused by a babbling idiot is handled by checking the data transfer rate and possibly blocking reception in such a manner that at least one communication path which transmits without errors is available for data which have not been disrupted or have not been transmitted by a defective device.

In embodiments of the method, the latter also comprises:
transmitting the first data and the second data, via the transmitting port of the switch device for the first control device, to the receiving port of the switch device for the second control device using at least one further switch device of a further network device having a first control device and a second control device; and
transmitting the first data and the second data, via the transmitting port of the switch device for the second control device, to the receiving port of the switch device for the first control device using at least one further switch device of a further network device having a first control device and a second control device.

In this case, in a respective further switch device, data received at a receiving port for the second control device of the further switch device are forwarded to a transmitting port for the first control device of the further switch device. Data received at a receiving port for the first control device of the further switch device are forwarded to a transmitting port for the second control device of the further switch device.

The uncoded or coded data are therefore transmitted from a first channel, which starts from a first control device, to a channel associated with the second control device. This is also effected the other way round, as a result of which the transmitting control component can determine whether the respective other channel associated with the second (redundant) control device has the same data result. In this respect, it is possible to determine whether the associated Ethernet switches or switch devices are operating reliably. If it is detected that at least one of the switch devices associated with the control device is acting erroneously, the transmitting control device is preferably passivated.

The method may also comprise:
comparing the first data with the second data in the first and/or second control device in order to generate a comparison result; and
passivating the network device on the basis of the comparison result.

If it is detected that the first and second data are not consistent with one another, that is to say are not linked to one another by means of the predefined coding, it is possible to detect an error in the data transmission or generation.

The method may also comprise:

transmitting the first and second data again via the first and second communication paths.

If, for example, data in a communication cycle are not detected or received from the transmitting control device again, an erroneous network component in the communication path can be inferred by means of repeated transmission and checking for correctly received data.

In the method, in a further network device, the first data and the second data can also be received at input ports for different control devices, and the received data can be compared with one another.

The method for operating the network arrangement preferably also comprises displaying an error message if compared first data and second data are not linked to one another by means of the predefined coding.

Finally, a network arrangement having a plurality of network devices which are coupled to a communication network is proposed. A respective network device comprises a first control device and a first switch device associated with the first control device. The respective network device also has a second control device and a second switch device associated with the second control device. The switch devices each have a transmitting and receiving port for transmitting and receiving data via the communication network, a first internal transmitting and receiving port for transmitting and receiving data between the switch devices and a second internal transmitting and receiving port for transmitting and receiving data to/from the control device. The network devices are set up, in particular, to carry out a method as described above.

The network arrangement is part of a vehicle, in particular.

The network devices may be sensor devices or actuator devices. Speed sensors, braking or shift control devices are conceivable as sensor devices. It is also possible to use control devices which enable drive-by-wire, for example. In this case, steering or acceleration pulses are electronically transferred to corresponding actuators via the network, for example, with the result that the desired response of the vehicle begins.

Overall, the result is a particularly reliable network arrangement which also operates reliably in the event of interference in communication channels. The redundant ring-type communication path set-up enables consistent control unit communication and low-complexity error analysis and correction and low-complexity handling of errors caused by babbling idiots.

In further embodiments of the network arrangement, simple network devices each having a control device and a switch device may also be provided in the network arrangement. In this case, simple network devices do not have a redundant control device and may be provided for less safety-relevant functions.

In embodiments of the network arrangement, at least one switch device comprises a classification device, a queue device and/or a scheduler device.

Particular data packets or data packets on predefined data paths, for example internally in a network device, are prioritized by implementing a queue, for example. In a queue, data objects such as data packets are received in the order in which they arrive and are then output again. This is carried out in a queue device. The classification device can accordingly classify arriving data packets and can assign them to a priority class. For example, according to the prioritization, data packets which arrive at the switch device from the internal CPU port are provided with a higher priority than data which arrive at the switch device from the external port, that is to say from the communication network. The classification device accordingly organizes the data packets to be routed or switched in the queue device. The scheduler device removes the data packets from the queue device and transmits them via the respective output port of the switch device.

The network devices are preferably each in the form of an individual FPGA, ASIC, IC chip or a hard-wired microcircuit.

A computer program product is also proposed, which product causes the method for operating a network arrangement as explained above to be carried out on one or more program-controlled devices.

A computer program product such as a computer program means can be provided or supplied as a storage medium, such as a memory card, USB stick, CD-ROM, DVD, or else in the form of a downloadable file, by a server in a network, for example. This can be effected in a wireless communication network, for example, by transmitting an appropriate file with the computer program product or the computer program means. A suitable program-controlled device is, in particular, a network device as described above.

Further possible implementations of the invention also comprise combinations that are not explicitly mentioned for method steps, features or embodiments of the method, the network arrangement, the network device or a network node that are described above or below for the exemplary embodiments. In this case, a person skilled in the art will also add or modify single aspects as improvements or additions to the respective basic form of the invention.

BRIEF DESCRIPTION

Some of the embodiments will be described in detail, with reference to the following figures, wherein like designations denote like members, wherein.

DETAILED DESCRIPTION

In the figures, identical or functionally identical elements have been provided with the same reference symbols unless indicated otherwise.

Figure 1:
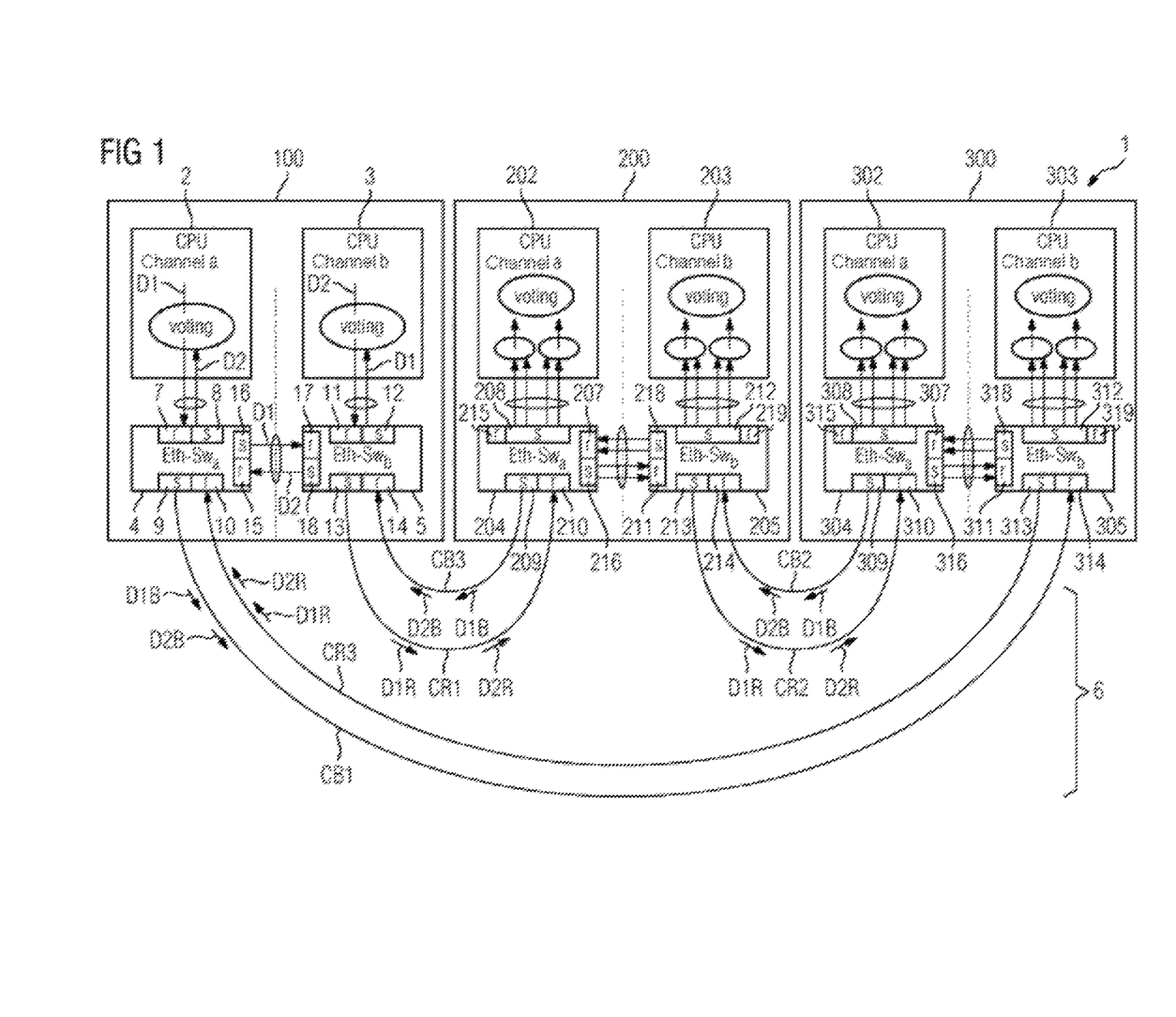
FIG. 1 shows a schematic illustration of a first embodiment of a network arrangement.

FIG. 1 illustrates a schematic illustration of a first embodiment of a network arrangement. The figures are also used to explain the method for operating the network arrangement.

FIG. 1 shows a network arrangement 1 which can be used, for example, as an Ethernet network in a vehicle. In this case, three network devices 100, 200, 300 are illustrated by way of example. They may be control components, for example. The network devices 100, 200, 300, which are also referred to as network nodes or control components below, each have redundant control devices 2, 3, 202, 203, 302, 303. The control devices can also be referred to as CPUs. The network devices 100, 200, 300 may also be referred to as subscribers of the network.

The control devices 2, 3, 202, 203, 302, 303 are adapted to carry out particular tasks or functions. This may be sensor detection or an actuator, for example. They can also be implemented as CPUs or microprocessors. It is conceivable, for example, for the control component 100 to be set up to detect a pedal state or a steering movement in the vehicle. It is conceivable, for example, for the control component or network device 100 to transmit a control signal or control data to a further control component in the network. In this case, it is necessary to ensure, in particular in the case of safety-relevant applications in motor vehicles, for example in the case of drive-by-wire, that the control data are consistently present at all network nodes.

The control components or network nodes or network devices 100, 200, 300 are provided with redundant Ethernet switch devices 4, 5, 204, 205, 304, 305. The Ethernet switch devices 4, 5, 204, 205, 304, 305 each have transmitting or output ports 9, 13, 209, 213, 309, 313 and receiving or input ports 10, 14, 210, 214, 310, 314, with the aid of which coupling to the communication network 6 is effected. In addition, the switch devices 4, 5, 204, 205, 304, 305 have first internal transmitting or output ports 16, 18, 216, 218, 316, 318 and first internal receiving or input ports 15, 17, 207, 211, 307, 311 for internally interchanging data between the switch devices of the respective network device 100, 200, 300. For the purpose of interchanging data with the control devices 2, 3, 202, 203, 302, 303, the switch devices 4, 5, 204, 205, 304, 305 have second internal transmitting or output ports 8, 12, 208, 212, 308, 312 and second internal receiving or input ports 7, 11, 215, 219, 315, 319.

In this case, the network device 100 comprises a CPU 2 and an associated Ethernet switch device 4. The Ethernet switch device 4 has a receiving port 7 and a transmitting port 8 which are communicatively coupled to the CPU 2. A further transmitting port 9 and receiving port 10 are coupled to the network 6 for transmitting and receiving data. Similarly, the CPU 3 has an Ethernet switch device 5 having a receiving port 11 and a transmitting port 12 for coupling to the CPU 3. The Ethernet switch device 5 also has a transmitting port 13 and a receiving port 14 for coupling to the network 6. In addition, transmitting ports 16, 18 and receiving ports 15, 17 are provided at the Ethernet switches 4, 5 in order to couple the two switch devices 4, 5 to one another. In this case, the two switch devices 4, 5 are produced separately, for example in the form of an FPGA or ASIC or microchip.

In a similar manner, the control components 200 and 300 have switch devices 204, 205, 304, 305 which are separate from one another and have transmitting and receiving ports 204, 210, 213, 214, 304, 310, 313, 314 for coupling to the network 6. The network devices 200, 300 may also be provided with the same elements as the network device 100, that is to say may be provided with switch devices having further internal ports.

The redundantly produced control data D1 and D2 are compared inside the network components. The CPU 2 provides data D1 and the CPU 3 provides data D2. In this case, the data are linked to one another by means of coding. That is to say, the data D1 result from the data D2 and conversely by means of a mathematical operation. A simple bit inversion, for example, is conceivable, with the result that the data D1 are the inverse of the data D2 and vice versa.

The internal consistency check in the control component 100 is carried out by generating the data D1, transferring them to the Ethernet switch 4 at the port 7 and forwarding them, via the port combination 16, 17, to the Ethernet switch 5 which provides the CPU 3 with the data D1. In a similar manner, the data D2 are transmitted to the CPU 2 via the ports 11, 18, 15 and 8. In this respect, an internal consistency check can be carried out by consistently coding the data D1 and D2 with one another. If the data are consistent with one another, that is to say match, modulo the predefined coding, for example a bit inversion, it can be assumed that the data reception via the ports 7 and 11, the data transmission via the ports 8 and 12, the switch devices 4, 5 for interchanging data between precisely these ports and the CPUs 2, 3 are operating correctly. In contrast, if the comparison result provides an inconsistency in the data D1 and D2, this indicates an error in the CPUs 2, 3 or the switch devices 4, 5, to which a possible response for ensuring data consistency is to passivate, that is to say deactivate, the control component 100.

Similar consistency checks are carried out in the network devices 200, 300. The data transmitted between the two switches 204, 205 and 304, 305 are not provided with reference symbols in FIG. 1. Data D2B and D1B are respectively transmitted from the top down, from the port 218 to the port 207. The data D1R and D2R are transmitted from the port 216 to the port 211. Data from the port 318 which correspond to D2B and D1B are likewise received by the port 307. Data from the port 316 which correspond to D1R and D2R are received by the port 311.

The network arrangement 1 is designed for ring-type communication paths. The possibility of point-to-point connections between the subscribers or network devices, which is present in an Ethernet infrastructure, in particular, may produce two communication rings which are separate from one another, share only the respective switch devices but do not use any common ports there on the receiving and transmitting sides. In the exemplary embodiment in FIG. 1, a first communication path composed of the segments CB1, CB2 and CB3 is produced. The data D1 and D2 run via these segments CB1, CB2 and CB3, which is indicated with the aid of the arrows D1B and D2B. In this case, the suffix B stands for the communication path B.

Furthermore, a communication path composed of the segments CR1, CR2 and CR3 runs in the opposite communication direction. The data D1 and D2 are likewise transmitted via this path, which is indicated by the arrows D2R and DIR. In this case, the suffix R stands for the communication path R.

The data D1 and D2 are therefore transmitted to all control components 201, 301 present in the network via disjoint communication paths. Each CPU 202, 203, 302, 303 receives the coded and uncoded data D1, D2 via different communication path, namely the two logical rings with an opposite communication direction. In this case, however, there is a single hardware ring. Each CPU 202, 203, 302, 303 compares the received values for the data D1, D2 via a communication path.

For example, the CPU 303 receives the data D1B and D2B via the communication path CB1. At the transmitting port 312, the switch device 304 transfers the data D1B and D2B received at the input port 314 to the CPU 303. The data D1B and D2B can be compared there. If said data are consistent with one another, this is indicative of an error-free communication path CB1.

The CPU 303 also receives the data D1R and D2R via the second communication path which results from the segments CR1 and CR2. The data D1R and D2R are received by the switch device 304 at the receiving port 310 and are output to the transmitting port 312 associated with the CPU 303. A consistency check can be carried out again. In addition, the CPU 303 can now carry out a comparison or parsing of the data received via the ring path CB1 and data received via the ring path CR1 and CR2. In the undisturbed case, both the data D1R and D2R and the data D1B and D2B and the data which are received via CB1 and via CR1-CR2 and are individually determined to already be consistent are consistent with one another. It results from this that the underlying data D1 and D2 generated by the CPU 2 and 3 are correct. If inconsistencies occur during the comparisons or parsing of the data, which are received via CB1 and via CR1-CR2 and are individually determined to already be consistent, in the control component 3 or the CPUs 302, 303, a communication error can be inferred.

Similar consistency checks are carried out in the control component 201 or the CPUs or control devices 202, 203. If one of the switch devices 4, 5, 204, 205, 304, 305 involved operates erroneously or fails, a corresponding network error can be detected if the data D1, D2 are repeatedly transmitted. A plurality of communication cycles with different data from different control devices are generally sent on the network 6. On the basis of other data (not illustrated in FIG. 1), the respective control components 201, 301 can determine whether or not their own switch 204, 205, 304, 305 is defective. In this respect, different error scenarios can be detected and handled.

As a result of the disjoint data paths CB1, CB2, CB3 and CR1, CR2, CR3, errors during transmission occur only independently of one another. The configuration in the form of an Ethernet ring of the network nodes or components 100, 201, 301 ensures consistent communication of control units having redundant control devices 2, 3, in particular, to the greatest possible extent.

Furthermore, a babbling idiot as an error source can be handled beyond the particularly reliable communication between the network devices as a control unit. In the case of a babbling idiot, one of the devices or nodes coupled in the network is defective and transmits meaningless data packets at a high data rate. As a result, the entire network or the network arrangement may be loaded in such a manner that meaningful information, for example control or status information, can no longer be reliably transmitted and received. In this case, a babbling idiot may transmit, in particular, data packets which also do not have any meaningful destination or receiving addresses into the network device, for example in the form of an Ethernet network. In this respect, the network is flooded with meaningless data and is possibly blocked.

In order to still enable reliable data traffic in this error situation, the switch devices 4, 5, 204, 205, 304, 305 in the network devices 100, 200, 300 are set up in such a manner that internal data traffic is given priority over data which arrive from the outside, that is to say from the communication network 6. This can be carried out, for example, using a queuing process with priority classes on the basis of the input port. FIGS. 2 to 6 explain possible implementations for prioritization of particular data packets using the example of the switch device 4 of the first network device 100.

Figure 2:
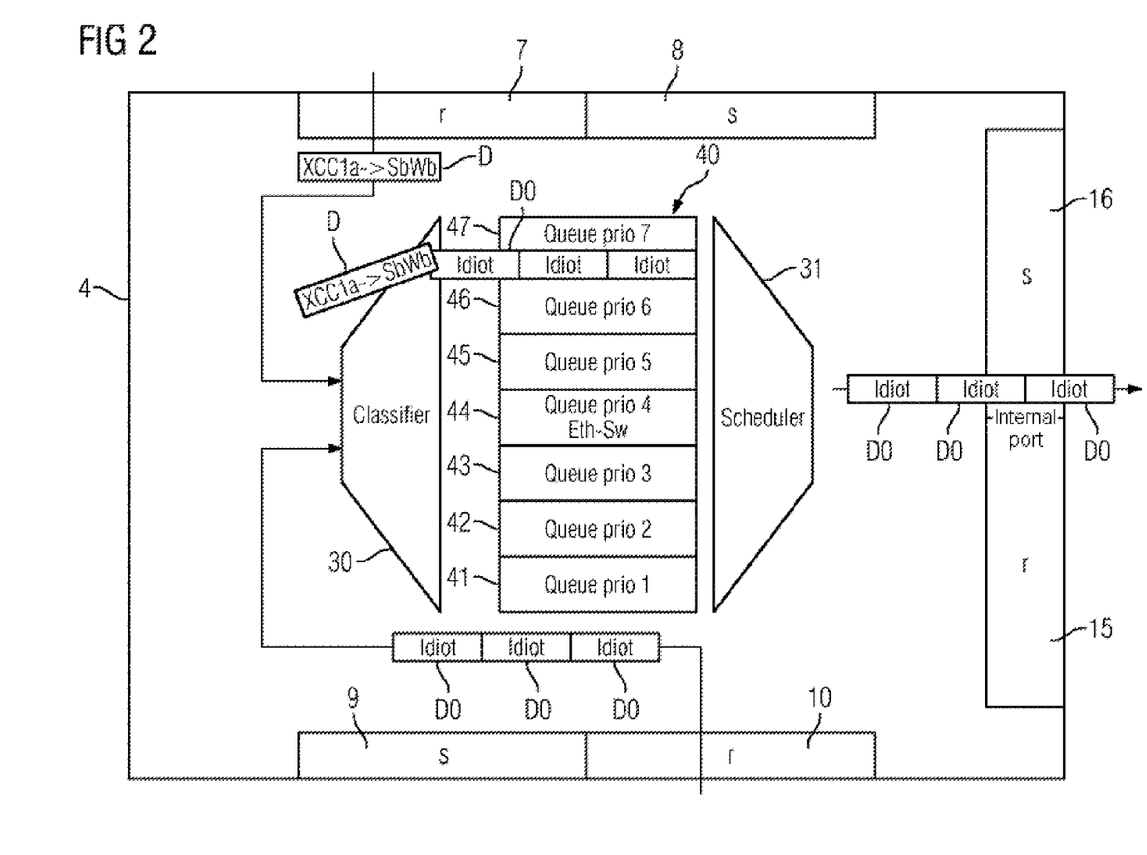
FIGS. 2-6 show schematic illustrations of embodiments of switch devices with communication sequences for explaining method aspects of error handling.

In this case, FIG. 2 shows an error situation without prioritization of internal data packets. In this case, FIG. 2 shows the switch device 4 having a first internal transmitting port 16 and a first internal receiving port 15 which, as indicated in FIG. 1, are coupled to the second switch device 5. A second internal receiving port 7 and a second internal transmitting port 8, which are also referred to as the CPU port below, are coupled to the control device 2. The transmitting port 9 and the receiving port 10, which are also referred to as external ports, are also seen in FIG. 2.

If a babbling idiot now occurs inside the network arrangement 1, meaningless data packets are received at the external receiving port 10, for example. These data packets are denoted D0. These meaningless data packets generally occur at a high frequency and load the bandwidth of the network. A conventional queue device 40 with an upstream classifier or classification device 30 and a scheduler device 31 is illustrated. Meaningful control data D are received by the CPU receiving port 7. Conventionally, the data packets D0, D are forwarded according to their priority class, of which there are seven classes 41-47 here. The classification device 30 determines identical priority classes for the data packets D and D0, for example. This is the priority class 47 in the present example. The queue device and the scheduler or scheduler device 31 therefore usually handle the meaningless data packets D0 in the same manner among actual meaningful data D. That is to say, the meaningless data packets D0 arriving at a high data rate are mainly forwarded to the transmitting port 16. In the adjacent channel b, the switch device cannot determine where the babbling idiot is, in particular because the meaningless data D0 do not contain any reliable sender addresses.

Figure 3:
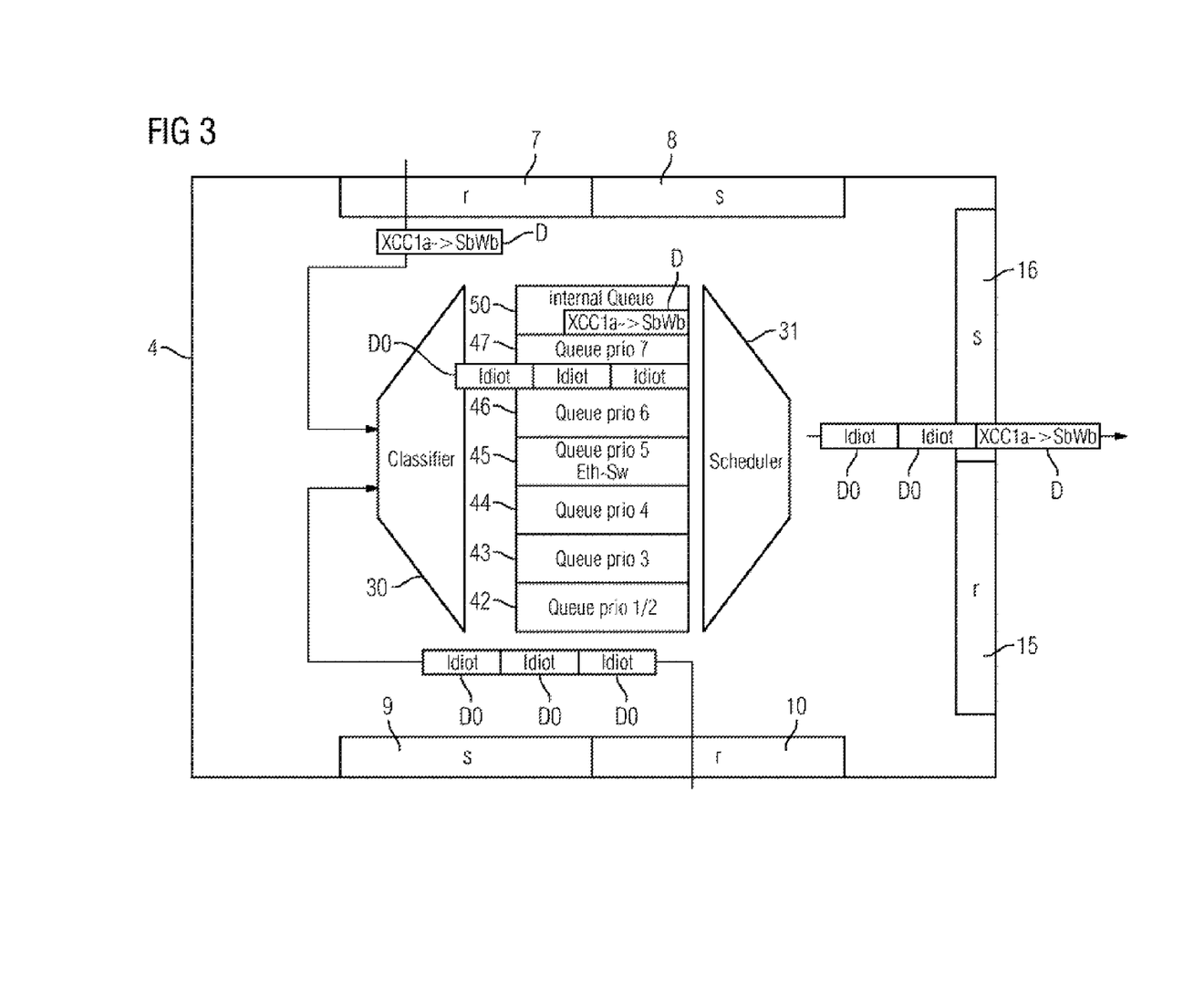

It is now proposed to prioritize particular data packets. In particular, the internal communication between the switch device 4 and the control device 2 associated with it and the adjacent internal switch device 5 is processed with priority over the data packets received from the outside. This is illustrated in FIG. 3 using an exemplary embodiment for queuing and scheduling. As already indicated in FIG. 2, the switch device 4 is provided with the CPU ports 7, 8, the internal ports 15, 16 and the external ports 9, 10. The exemplary case is considered in which data D are transmitted from the CPU 2 to the CPU 3 for checking. However, the switch device 4 receives meaningless data packets D0 at a high data rate at the external receiving port 10 because there is a babbling idiot in the network.

Both the meaningless data D0 and the actual meaningful control data D arrive at the classifier 30. The queue device is now configured in such a manner that seven priority classes can be handled. The scheduler device 31 downstream in terms of data transmits the data packets prepared by the queue device via the transmitting port 16. Seven priority classes are taken into account in conventional Ethernet switch devices. In order to take into account the data packets arriving from the CPU port 7 in a prioritized manner, the two lowest priority classes are combined to form one priority 1/2. The standard priority classes 3 to 7 (43-47) are then supplemented with an internal priority class, an internal queue, 50. The classification device 30 classifies the data D arriving from the CPU port 7 as internal queue data. The latter are preferably forwarded by the scheduler. Despite the meaningless data packets D0 which arrive with a priority of 7, for example, and are present at a high data rate, the meaningful data D are reliably forwarded to the adjacent switch device 5 and therefore to the CPU 3 via the internal output port 16. The respective control task can be reliably performed despite a babbling idiot in the network as a result of the creation of the internal queue 50.

The control device 3 not illustrated in FIG. 3 (cf. FIG. 1) can use the data delivered to it by the control device or CPU 2 to infer whether, for example, the CPU 2 or one of the switch devices 4, 5 itself is operating erroneously as a babbling idiot. If the switch device 4 with the prioritized internal queues receives data packets D which can be interpreted from the channel a, that is to say the CPU 2, it is inferred that its own network device 100 is probably operating reliably. If, despite the internal prioritization, the CPU 3 does not receive any meaningful data from the CPU 2, it can be inferred that the error or babbling idiot is present in the CPU 2 or one of the switch devices 4, 5. In this respect, appropriate error handling measures, for example deactivation of the network device or the control device 2, can be carried out.

Figure 4:
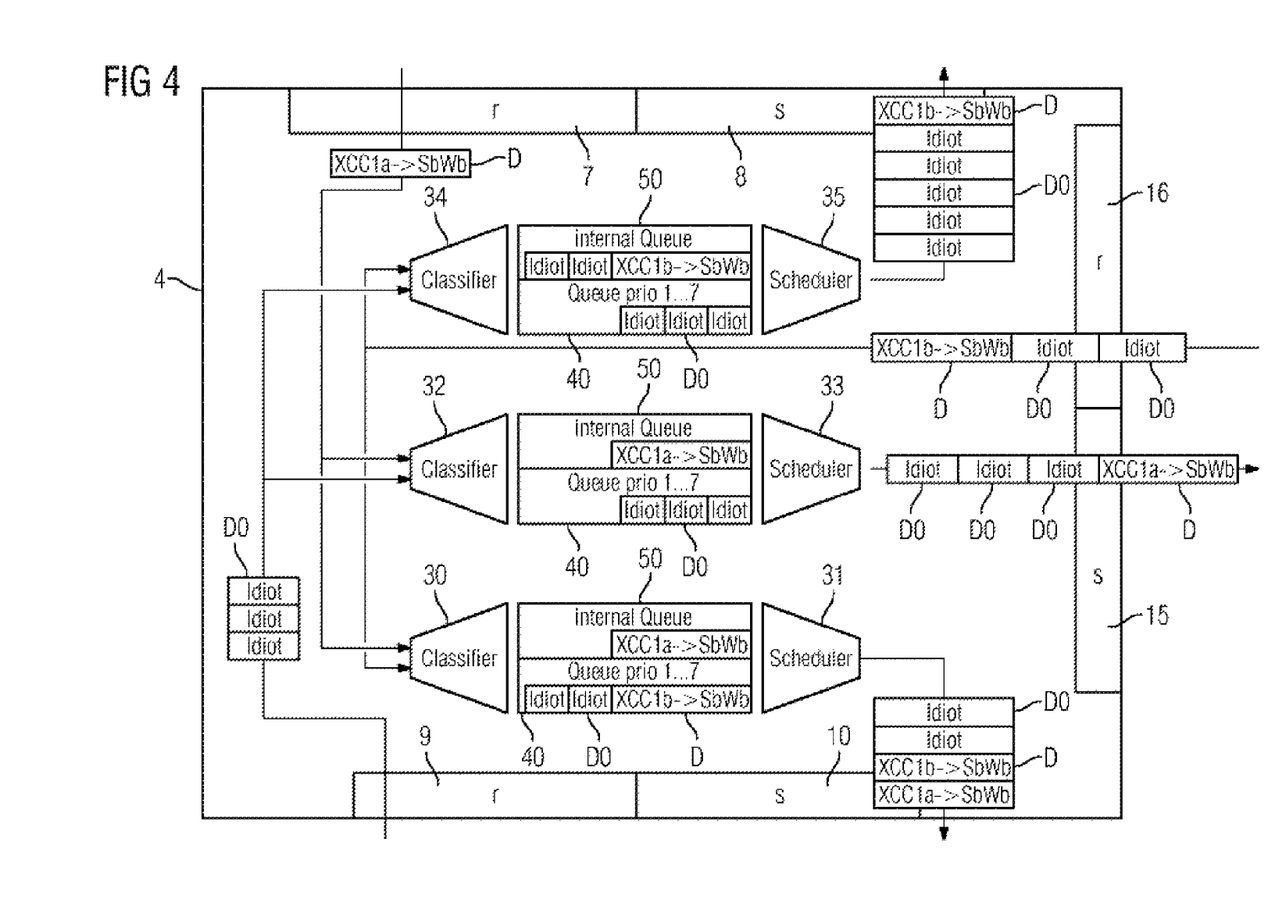

FIG. 4 illustrates another embodiment of a switch device with internal prioritization. The switch device 4 is provided with three internal queues 50, each of which has a classification device 30, 32, 34 connected upstream and a scheduler device 31, 33, 35 connected downstream. Reference is made to a lower, a middle and an upper queue in the illustration in FIG. 4.

For example, meaningless data D0 from the communication network arrive from the external port 9. Said data are supplied to the classification devices 32, 34. Meaningful data D from the coupled CPU 2 arrive at the lower and middle classification devices 30, 32 via the CPU port 7.

Data which arrive from the internal port 16 are passed to the lower classification device 30 and to the upper classification device 34.

It is assumed, for example, that the data generated by the adjacent switch device (identical to FIG. 1) 5 contain both meaningful data D and meaningless data D0. An internal queue, which has the highest forwarding priority, and standard priorities 1-7 are respectively provided inside the queue devices 50. The following prioritization is carried out by the three strands of classification devices 30, 32, 34, queues 50 and scheduler devices 31, 33, 35:

CPU data from the CPU receiving port 7 are given priority over internal received data from the internal port 16.

Furthermore, CPU data from the CPU port 7 are given priority over data from the communication network at the port 9.

In addition, internal data from the internal receiving port 16 are given priority over the data received from the communication network at the port 9.

This results in the meaningful data D nevertheless being reliably delivered to the CPU 2, for example for a consistency check, despite the meaningless data packets D0, in particular at the transmitting port 8. The same applies to the data for the CPU 3 which are present at the transmitting port 15.

Figure 5:
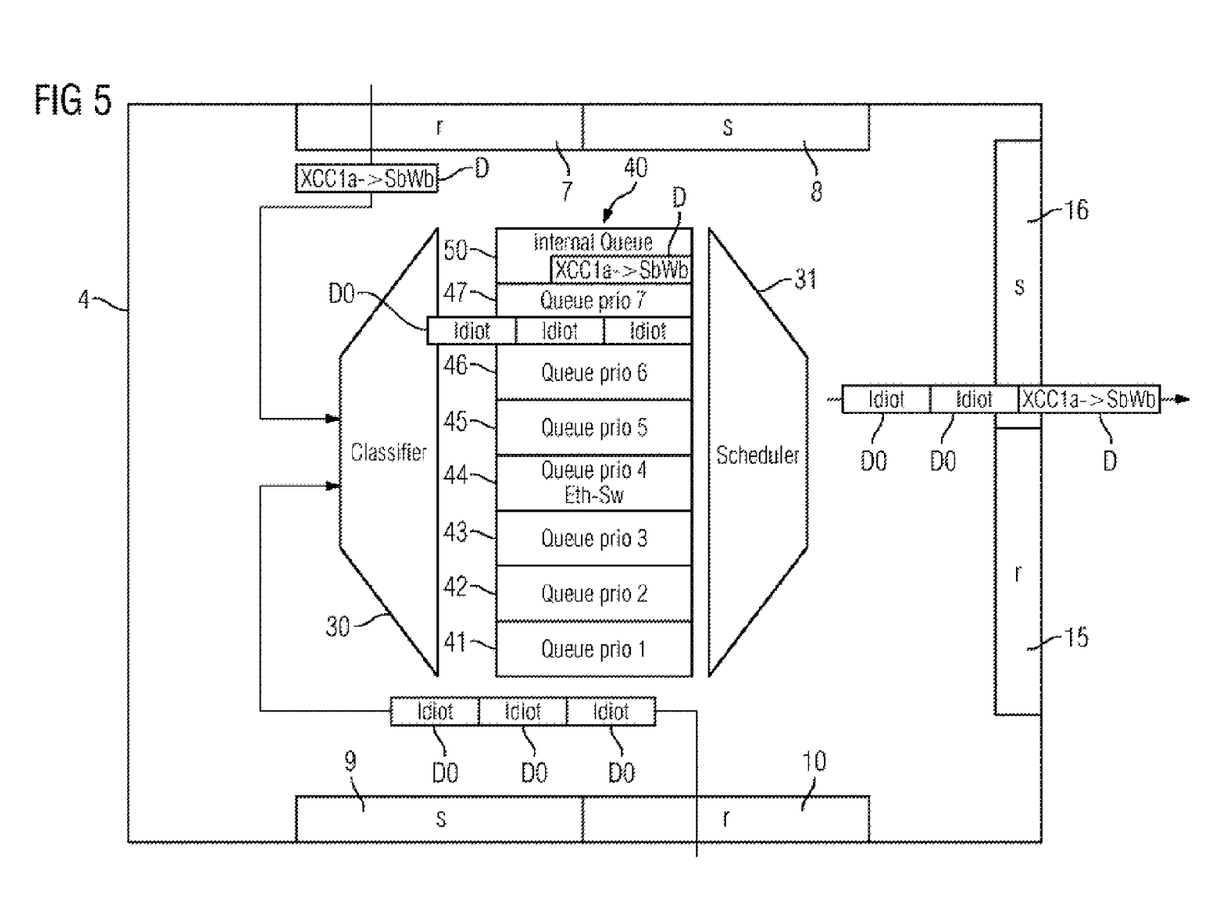

FIG. 5 shows yet another embodiment for the implementation of prioritization in the switch device 4. In this case, the switch device 4 has substantially the same elements as are illustrated in FIG. 2. In this case, the queue device 40 comprises the seven standard priority classes 41-47 and an additional internal priority class 50. The internal additional priority class always has priority in this case. The queue is substantially configured by the classification device 30 which can also be implemented, in particular, in the form of a computer program or a routine. In this case, in comparison with conventional classification modules, either an additional priority class is created, as indicated here in FIG. 5, or particular priority classes are combined, as indicated in FIGS. 3 and 4. Overall, implementation is easily possible by means of standard switch components. Reparameterization, for example according to the prioritizations illustrated in FIG. 5 or FIGS. 3 and 4, can be easily carried out.

Figure 6:
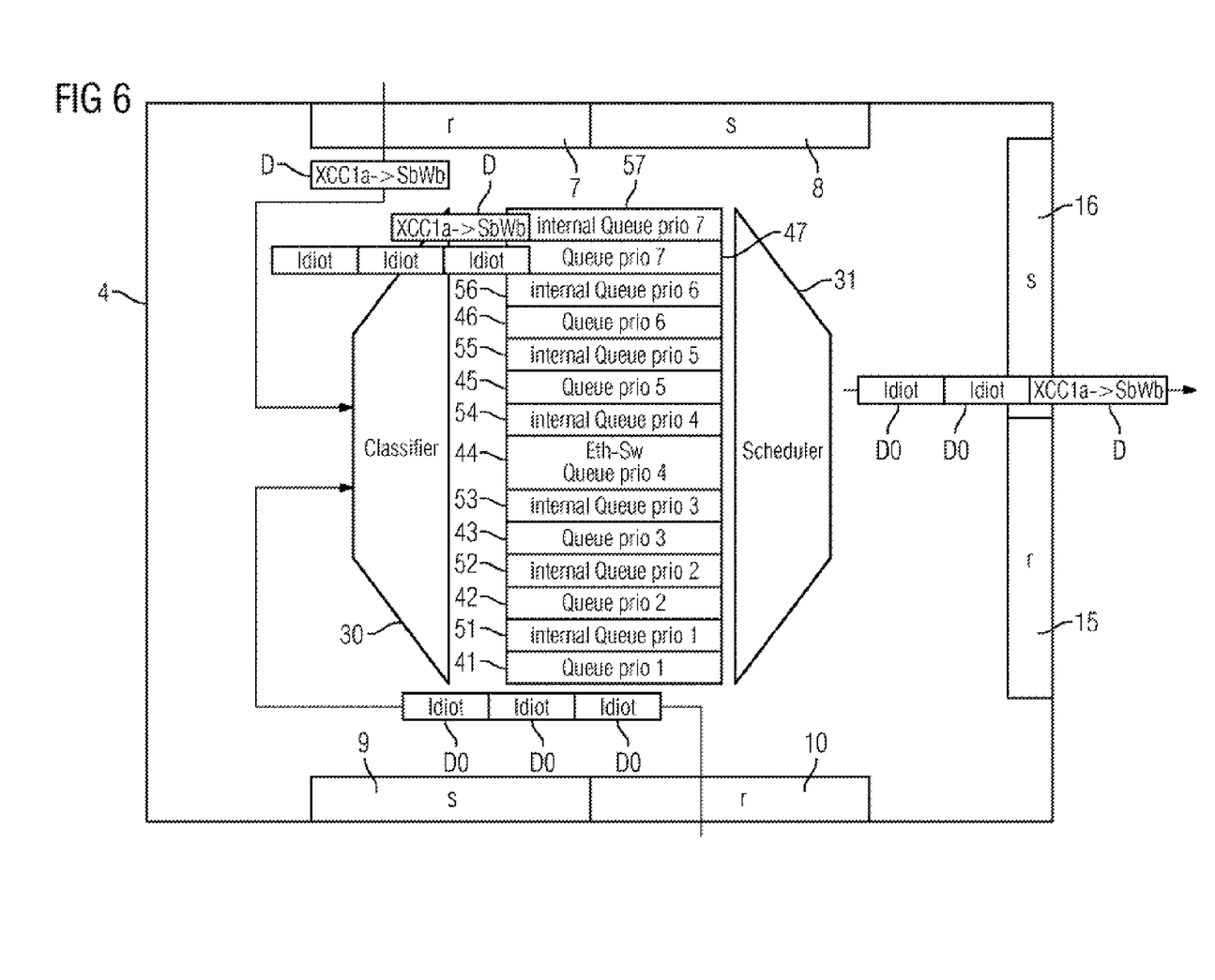

Finally, FIG. 6 illustrates another embodiment of a switch device 4 and indicates aspects of the method for operating the network arrangement with respect to the prioritization. In addition to the elements of the switch device 4 which have already been illustrated in FIGS. 2-5, an internal queue priority class 51-57 is provided for each conventional priority class 41-47 and is given priority over the latter. In the example illustrated in FIG. 6, the data D from the CPU 2, which are present at the receiving port 7, are assigned to the priority class 7. The same applies to the meaningless data D0 at the external receiving port 10. As a result of the prioritization or division of the priority class 7 into the internal priority class 57 and the conventional priority class 47, the meaningful data or control data D, in particular, are reliably forwarded. In a similar manner to the illustration in FIG. 6, other meaningful data, for example priority classes 1-6, can also each be forwarded via the internal queue 51-56.

Furthermore, a combination of the prioritization indicated in FIG. 6 with that illustrated in FIG. 4 is conceivable. In addition, further prioritization patterns may be implemented. For this purpose, the classification module or classification device 30 is accordingly parameterized, for example. In principle, it is also possible to carry out the classification on the basis of data contents of the transferred data packets. However, the prioritization is preferably carried out only in a port-based manner.

Different babbling idiot errors are discussed below using the network arrangement 1 illustrated in FIG. 1. In this case, it is assumed that corresponding prioritization operations are carried out in the switch devices 4, 5, 204, 205, 304, 305.

If, for example, the switch device 205 is erroneous and, as a babbling idiot, transmits meaningless data packets, no meaningful data packets arrive at the CPU 202 via the port 207 and 208. Inside the network device 200, the CPU 202 discerns that virtually only meaningless data are received from the ports 121 and 207 despite the prioritization of the data traffic. The CPU 202 therefore discerns that either the neighboring CPU 203 or the switch device 204 or 205 is operating erroneously. In a similar manner, the CPU 203 receives virtually only meaningless data from the ports 108 and 211 despite the prioritization of the data traffic. Consequently, the network device 200 is deactivated or passivated, with the result that the network is subsequently no longer loaded with meaningless data packets. Reliable communication between the network devices 100 and 300 is now possible again via CB1 and CR3.

Figure 7:
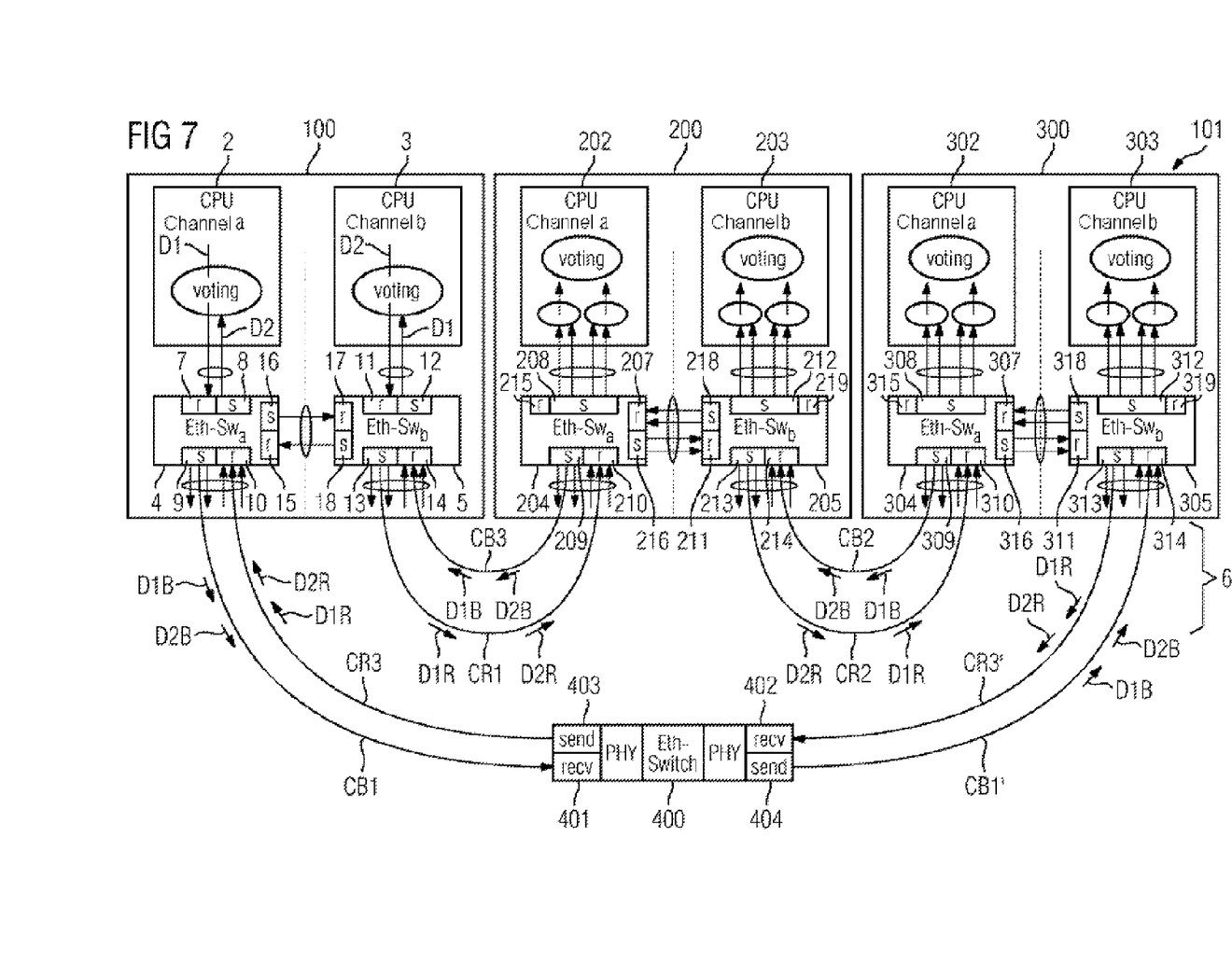
FIG. 7 shows a schematic illustration of a second embodiment of a network arrangement.

FIG. 7 shows a second exemplary embodiment of a network arrangement 101. In this case, the network arrangement 101 comprises substantially the same elements as illustrated in FIG. 1. However, the communication path segment CB1 and CR3 is interrupted by a simple switch device 400. In this case, the switch device 400 has receiving ports 401, 402 and transmitting ports 403, 404. In this respect, the communication path segments CB1, CB1' and CR3, CR3' are produced.

If this switch device 400, which does not have any internal control mechanisms, now becomes the babbling idiot, meaningless data arrive at the ports 314 and 10 at a high data rate. The consistency check will nevertheless take place successfully in the network device 100 as a result of the prioritization of the internal data in the switch 4 and 305. Inside the network device 100, 200, 300, it is substantially possible to detect where the babbling idiot is in the network arrangement. In this respect, a table containing the functional CPUs in the system can be created in each network device 100, 200, 300. After the error scenario explained in FIG. 5 in which the switch device 400 is the babbling idiot, the network device 100 discerns, as a result of the internal prioritization, that it itself is not operating erroneously.

This is because the respective data item from the neighboring CPU 2, 3 is reliably present at the transmitting ports 8, 12 as a result of the prioritization. Data which cannot be interpreted are mainly present at the port 208, which data were internally prioritized by the switch device 205 and have been passed to the port 207. Data which come from the network device 100 and 300 and the data which cannot be interpreted from the switch device 400 are present at the port 212. Virtually only data which cannot be interpreted are passed to the CPU 302 at the port 308 since the switch device 305 forwards the meaningless data from the switch 400. In addition to the data which cannot be interpreted from the switch 400, data from the network devices 100 and 200 are also present at the port 312.

Overall, the network device 100 discerns that it is functional, the network device 200 discerns that the network device 100 is not operating as a babbling idiot and the network device 300 discerns that the network device 200 is not the babbling idiot.

In a similar manner, it is likewise possible to detect, in a babbling simplex or a simple switch device 400, as illustrated in FIG. 7, where the babbling idiot is in the network if internal consistency checks are carried out, for example, in an appropriately equipped network device 200 or 300. A direct neighbor is identified as the babbling idiot at a control device 2, 3, 202, 203, 302, 303 when only data which cannot be interpreted arrive at a CPU in the same network arrangement in addition to the data which can be interpreted from the neighboring CPU. It is then inferred that the neighbor connected to the respective other channel is the babbling idiot.

Figure 8:
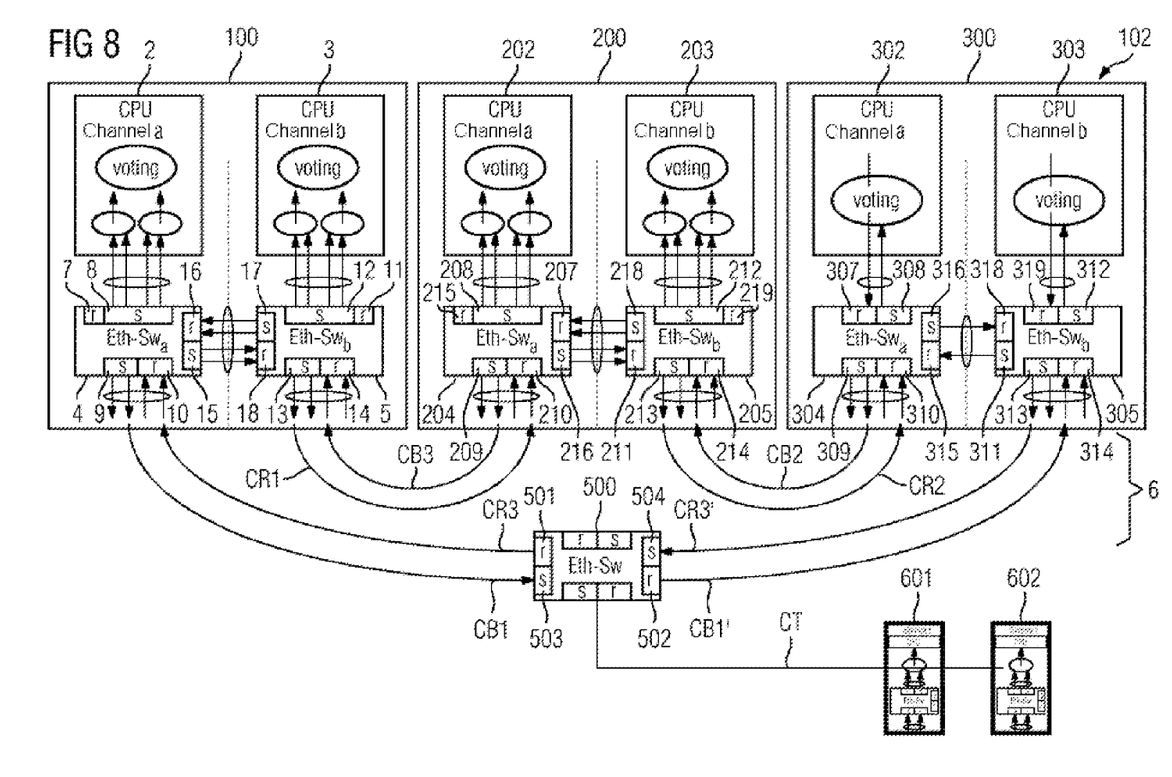
FIG. 8 shows a schematic illustration of a third embodiment of a network arrangement.

FIG. 8 shows yet another embodiment of a network arrangement 102. In this case, in addition to the switch 500, the network arrangement 102 comprises a spur line with simplex devices 601, 602. If the simplex device 602, which does not have redundant control and switch devices, is defective, for example, it transmits data which cannot be interpreted into the network on the spur line CT at a high data rate. If there are corresponding spur lines in the network, the coupling switch 500, for example, is set up in such a manner that the data rate is strictly limited by a rate limiting method, which arrives in the ring line CB1, CB1', CB2, CB3 and CR1, CR2, CR3, CR3' from the spur line. Furthermore, the coupling switch device 500 may be designed with special safety mechanisms which detect a babbling idiot on the spur line.

Figure 9:
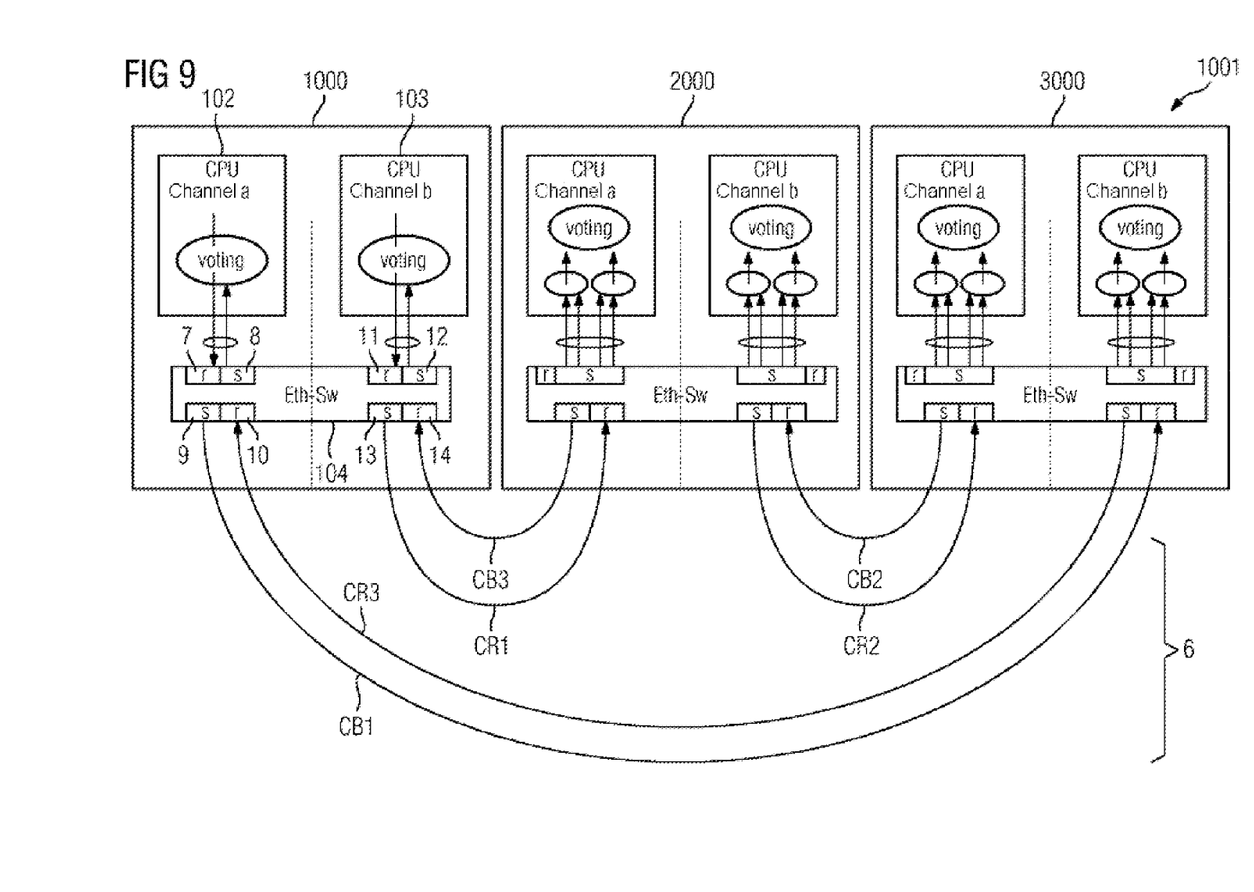
FIG. 9 shows a schematic illustration of a fourth embodiment of a network arrangement.

FIG. 9 shows another embodiment of a network arrangement 1001. The network arrangement substantially comprises the same elements as those illustrated in FIG. 1. Therefore, only the modified network device 1000 is discussed here. In comparison with the network devices 100, 200, 300, the network device 1000 has an individual switch device 104 which integrates the functions of the switch devices 4, 5. In addition, the network arrangement 1001 is operated in the manner previously described with respect to the other embodiments. Internal data traffic is given priority over data from the communication network 6.

Overall, the prioritization results in a particularly reliable network arrangement and a method for operating the latter. The prioritization of internal data makes it possible to detect babbling idiots in the network, with the result that tables which list the functioning elements in the network can be managed in the CPUs or the network devices.

The method and the proposed network arrangement with its ring structure and prioritization of the internal ports of the network devices therefore provide extremely consistent and reliable control unit communication in safety-relevant applications. All possible individual errors either do not result in any consistent data being able to be generated in one or more network devices or can be located within a communication cycle. In addition, the disruption of a network device as a babbling idiot, that is to say uncontrolled transmission of data into the network at a high data rate, cannot result in communication failure.

Although the invention has been described and illustrated in more detail using the preferred exemplary embodiment, the invention is not restricted by the disclosed examples and other variations can be derived therefrom by a person skilled in the art without departing from the scope of protection of the invention.

LIST OF REFERENCE SYMBOLS

1 Network arrangement
2, 3 Control device
4, 5 Switch device
6 Communication network
7, 10, 11, 14, 15, 17 Input port
8, 9, 12, 13, 16, 18 Output port
101, 102 Network arrangement
30 Classification device
31 Scheduler device
40 Queue
41-47 Priority class
50 Internal queue
51-57 Priority class
100, 200 Network device
202, 203 Control device
204, 205 Switch device
208, 209, 212, 213, 216, 218 Output port
207, 210, 211, 214, 215, 219 Input port
300 Network device
301 Network arrangement
302, 303 Control device
304, 305 Switch device
308, 309, 312, 313, 316, 318 Output port
307, 310, 311, 314, 315, 319 Input port
400 Switch device
401, 402 Input port
403, 404 Output port
500 Switch device
501, 502 Input port
503, 504 Output port
601, 602 Simplex network device
CB1-CB3 Communication path segment
CR1-CR3 Communication path segment
D1R, D1B First data
D2R, D2B Second data
D Meaningful data
D0 Meaningless data

The invention claimed is:

1. A method for operating a network arrangement having network devices coupled to a communication network, comprising:
providing network devices each having a first control device and a first switch device associated with the first control device and a second control device and a second switch device associated with the second control device, the switch devices each having a transmitting and receiving port for transmitting and receiving data via the communication network, a first internal transmitting and receiving port for transmitting and receiving data between the switch devices and a second internal transmitting and receiving port for transmitting and receiving data to/from the first and/or second control devices;

generating first data by the first control device and second data by the second control device;

transmitting the first data from the first control device to the second control device via the associated switch devices and transmitting the second data from the second control device to the first control device via the associated switch devices, the first and second data passing through the first and second internal transmitting and receiving ports; and prioritizing data interchange by the first and second internal receiving ports with respect to data interchange by the receiving ports for transmitting and receiving data via the communication network.

2. The method as claimed in claim 1, also comprising: prioritizing data interchange by the second internal receiving ports with respect to data interchange by the first internal receiving ports.

3. The method as claimed in claim 1, also comprising: wherein said step of generating first data by the first control device and second data by the second control device, further includes the first data and the second data being linked to one another by means of predefined coding;

transmitting the first data and the second data from the transmitting port of the switch device for the first control device to the receiving port of the switch device for the second control device via a first communication path; and transmitting the first data and the second data from the transmitting port of the switch device for the second control device to the receiving port of the switch device for the first control device via a second communication path;

and wherein the data on the first and second communication paths passing through the same network devices in the opposite direction.

4. The method as claimed in claim 3, also comprising: transmitting the first data and the second data, via the transmitting port of the switch device for the first control device, to the receiving port of the switch device for the second control device using at least one further switch device of a further network device having a first control device and a second control device; and transmitting the first data and the second data, via the transmitting port of the switch device for the second control device, to the receiving port of the switch device for the first control device using at least one further switch device of a further network device having a first control device and a second control device;

wherein, in a respective further switch device, data received at a receiving port for the second control device of the further switch device are forwarded to a transmitting port for the first control device of the further switch device, and data received at a receiving port for the first control device of the further switch device are forwarded to a transmitting port for the second control device of the further switch device.

5. The method as claimed in claim 1, the first and second switch devices being integrated in one switch device in at least one network device.

6. The method as claimed in claim 1, also comprising: comparing the first data with the second data in the first and/or second control device in order to generate a comparison result; and passivating the network device on the basis of the comparison result.

7. The method as claimed in claim 5, also comprising: transmitting the first and second data again via the first and second communication paths.

8. The method as claimed in claim 5, also comprising: in a further network device, receiving the first data and the second data at input ports for different control devices, and comparing the received data.

9. The method as claimed in claim 1, wherein the communication network is an Ethernet network.

10. A computer program product which causes a method as claimed in claim 1, comprising a computer readable hardware storage device having computer readable program code stored therein, said program code executable by a processor of a computer system to implement a method to be carried out on one or more program-controlled devices.

11. A data storage medium having a stored computer program with instructions which cause a method as claimed in claim 1 to be carried out on one or more program-controlled devices.

12. A network arrangement having a plurality of network devices which are coupled to a communication network, a respective network device comprising a first control device and a first switch device associated with the first control device and a second control device and a second switch device associated with the second control device, the switch devices each having a transmitting and receiving port for transmitting and receiving data via the communication network, a first internal transmitting and receiving port for transmitting and receiving data between the switch devices and a second internal transmitting and receiving port for transmitting and receiving data to/from the control device; the network devices being set up to carry out a method as claimed in claim 1.

13. The network arrangement as claimed in claim 12, the first and second switch devices being integrated in one switch device in at least one network device.

14. The network arrangement as claimed in claim 12, wherein at least one switch device comprises a classification device, a queue device and a scheduler device.

15. The network arrangement as claimed in claim 12, wherein simple network devices each having a control device and a switch device are provided in the network arrangement.

16. The network arrangement as claimed in claim 12, wherein the network devices are each in the form of an individual FPGA, ASIC, IC chip or a hard-wired microcircuit.

* * * * *